US012795241B2

(12) United States Patent
Siboni et al.

(10) Patent No.: US 12,795,241 B2
(45) Date of Patent: Nov. 10, 2026

(54) SMART WALL FOR FENCE PROTECTION

(71) Applicant: Magna BSP Ltd., DN Arava (IL)

(72) Inventors: Haim Siboni, Beer Yaakov (IL); Sharon Yehoshua, Telalim (IL); Levy Zruya, Jerusalem (IL)

(73) Assignee: Magna BSP Ltd., DN Arava (IL)

( * ) Notice: Subject to any disclaimer, the term of this patent is extended or adjusted under 35 U.S.C. 154(b) by 0 days.

(21) Appl. No.: 19/043,080

(22) Filed: Jan. 31, 2025

(65) Prior Publication Data

US 2025/0184609 A1 Jun. 5, 2025

Related U.S. Application Data

(63) Continuation-in-part of application No. PCT/IL2023/050798, filed on Aug. 1, 2023.

(30) Foreign Application Priority Data

Aug. 1, 2022 (IL) ........................................ 295267

(51) Int. Cl.
*H04N 23/00* (2023.01)
*H04N 13/00* (2018.01)
(Continued)

(52) U.S. Cl.
CPC ......... *H04N 23/695* (2023.01); *H04N 13/243* (2018.05); *H04N 13/246* (2018.05); *H04N 13/25* (2018.05); *H04N 13/296* (2018.05); *H04N 23/51* (2023.01); *H04N 23/61* (2023.01); *H04N 23/90* (2023.01); *H04N 23/662* (2023.01)

(58) Field of Classification Search
None
See application file for complete search history.

(56) References Cited

U.S. PATENT DOCUMENTS

2004/0061781 A1* 4/2004 Fennell ............ G08B 13/19608 348/E7.086
2005/0246065 A1* 11/2005 Ricard .................. G01S 17/931 700/258

(Continued)

OTHER PUBLICATIONS

International Search Report and Written Opinion, dated Nov. 14, 2023, for International Application No. PCT/ IL2023/050798. (7 pages).

*Primary Examiner* — Zhihan Zhou
(74) *Attorney, Agent, or Firm* — Seed Intellectual Property Law Group LLP

(57) ABSTRACT

A system for fence protection, comprising a first camera in a hybrid stereoscopic configuration, being directed to the area along the lower portion of the fence; a second camera connected to the first camera, for informing the first camera about any potential detection performed by the first camera, the second camera having configuration and optics designed for long ranges, for obtaining in-depth field of view, with pan and tilt capabilities, for allowing scanning and in-depth detection operations; a third inquiring Pan-Tilt-Zoom (PTZ) camera with high zoom capability, including visible and IR ranges, the third PZT camera is operated by the first camera by transmitting, to the third PZT camera, the location where detection occurred, thereby triggering the third PZT camera to perform scanning operations in a predetermined area around the location.

10 Claims, 4 Drawing Sheets

(51) Int. Cl.

| | |
|---|---|
| ***H04N 13/243*** | (2018.01) |
| ***H04N 13/246*** | (2018.01) |
| ***H04N 13/25*** | (2018.01) |
| ***H04N 13/296*** | (2018.01) |
| ***H04N 23/51*** | (2023.01) |
| ***H04N 23/61*** | (2023.01) |
| ***H04N 23/695*** | (2023.01) |
| ***H04N 23/90*** | (2023.01) |
| *H04N 23/661* | (2023.01) |

(56) References Cited

U.S. PATENT DOCUMENTS

| | | | | |
|---|---|---|---|---|
| 2010/0265331 | A1* | 10/2010 | Tanaka | G08B 13/19673 348/36 |
| 2012/0143430 | A1* | 6/2012 | Broggi | G01S 17/931 348/148 |
| 2014/0160294 | A1* | 6/2014 | Naylor | G08B 13/1961 348/155 |
| 2019/0056483 | A1* | 2/2019 | Bradley | G01S 7/4815 |
| 2019/0230269 | A1* | 7/2019 | Saito | G08B 13/19617 |
| 2019/0235126 | A1* | 8/2019 | Petruk | H04N 23/698 |
| 2020/0065977 | A1* | 2/2020 | Duran | H04N 23/64 |
| 2020/0084353 | A1* | 3/2020 | Wacey | H04N 13/239 |
| 2022/0172380 | A1* | 6/2022 | Lee | F16M 13/02 |
| 2023/0043342 | A1* | 2/2023 | Tremblay | G06V 20/52 |

* cited by examiner

SMART WALL FOR FENCE PROTECTION

FIELD OF THE INVENTION

The present invention relates to the field of security and defense systems. More particularly, the invention relates to a smart wall system with automatic intrusion detection and tracking capabilities.

BACKGROUND OF THE INVENTION

Separation walls and fences are widespread as barriers along borders between countries, or around strategic and sensitive sites, so as to detect and prevent unauthorized intrusions.

A conventional fence, or any kind of physical barrier, does not provide sufficient security and protection against intruders or illegal penetration, since intruders can breach the barrier at rural points or even bypass the barrier using ladders or via dug tunnels.

Several attempts were made in order to detect intruders using cameras that are installed along a fence or a barrier. However, this solution raises a dilemma regarding the direction of looking. The Field Of View (FOV) of an installed camera may be closer to the fence. In this case, the FOV of the installed is directed to be lower, in order to cover the area being closer to the fence.

Alternatively, the Field Of View (FOV) of an installed camera may be in depth. In this case, the FOV is directed to be higher, in order to cover the area being and farther from the fence to the fence.

In some cases, an inquiry is needed for identifying the intruder right after detection and if required, tracking his movements. However, using each type of camera alone, has insufficient accuracy and detection capabilities.

Beside intruders detection, in the last decades, the appearance of drones and other types of Unmanned Aerial Vehicles (UAVs military aircrafts that are guided autonomously, by remote control, or both and that carries sensors, target designators, offensive ordnance, or electronic transmitters designed to interfere with or destroy enemy targets), which become a serious threat that is challenging the defense systems all over the world.

It is, therefore, an object of the present invention to provide a solution to the above problems, to meet the above mentioned requirements.

It is another object of the present invention to provide a smart wall system with automatic intrusion detection and tracking capabilities, against intrusions made by UAVs (such as drones).

Other objects and advantages of the invention will become apparent as the description proceeds.

SUMMARY OF THE INVENTION

A system for fence protection, comprising:

a) a first camera in a hybrid stereoscopic configuration, being directed to the area along the lower portion of the fence;

b) a second camera connected to the first camera, for informing the first camera about any potential detection performed by the first camera, the second camera having configuration and optics designed for long ranges, for obtaining in-depth field of view, with pan and tilt capabilities, for allowing scanning and in-depth detection operations;

c) a third inquiring Pan-Tilt-Zoom (PTZ) camera with high zoom capability, including visible and IR ranges, the third PZT camera is operated by the first camera by transmitting, to the third PZT camera, the location where detection occurred, thereby triggering the third PZT camera to perform scanning operations in a predetermined area around the location.

Upon obtaining intrusion detection by the second camera, a signal is sent to the first camera for raising the sensitivity of the first camera, while upon detecting an intrusion by the second camera, transmitting to the third camera the intrusion location for zooming and inquiring purposes.

The sensitivity of the first camera may be raised by using adaptive thresholds, to obtain a higher detection probability.

Target classification capabilities may be obtained by target magnification on the sensor of each camera.

Target tracking capability may be obtained by slaving the third camera without interrupting any running search and scan processes.

The system may be implemented as hybrid stereoscopic configuration, comprising two different calibrated cameras, one camera being sensitive to visible light, and the other camera being in the IR spectral range, with stereoscopic properties.

The system may be implemented as full stereoscopy with identical sensors, visible and/or IR sensitive, and a quadroscopic configuration, including data fusion between any two stereoscopic channels.

A metallic or a transparent bulletproof glass cylinder may be added around each camera for protecting the camera against bullets, to be installed into specific perforations in the wall, for providing rotating capability to the cylinder, in order to cover a wider angle by the protected camera.

The system may comprise day cameras which are sensitive to visible light and/or IR cameras which are sensitive to IR radiation in various spectral ranges and/or any combination of such spectral ranges.

The system may further comprise:

a) fourth camera with a FOV directed to the sky and having configuration and optics designed for long ranges, for obtaining in-depth field of view, with pan and tilt capabilities, for allowing scanning and in-depth detection operations;

b) a fifth inquiring Pan-Tilt-Zoom (PTZ) camera with high zoom capability, including visible and IR ranges, said fifth PZT camera is operated by said fourth camera by transmitting, to said fifth PZT camera, the location where UAV detection occurred, thereby triggering said fifth PZT camera to perform scanning operations in a predetermined area around said location.

The fourth camera is installed at the higher part of the wall/fence, with a FOV that is directed to the sky.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
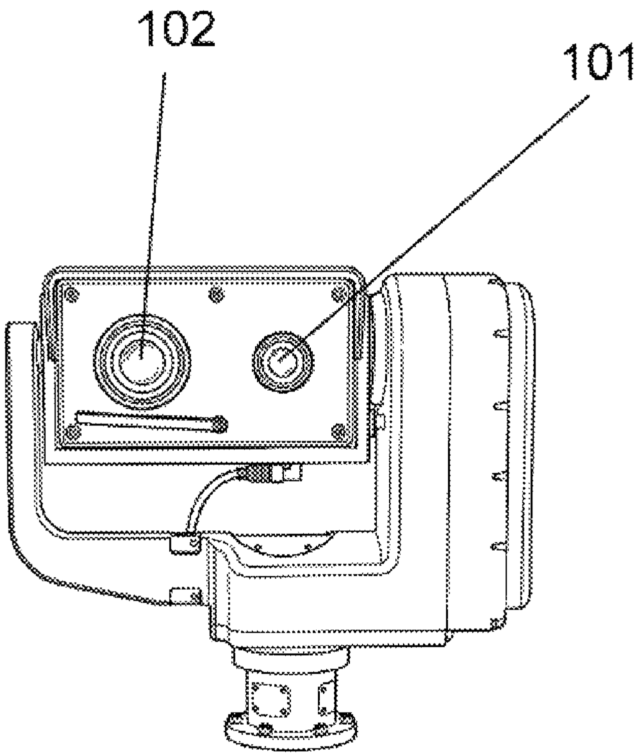
FIG. 1 illustrates a hybrid stereoscopic configuration of camera 101, according to an embodiment of the invention.

The present invention provides a smart wall system with automatic intrusion detection and tracking capabilities. The system comprises a combination of the following three different cameras:

Camera No. 101: This camera is implemented in a hybrid stereoscopic configuration (will be detailed below). The FOV of camera 101 is directed to the closer area along the fence, and to the lower part of the fence.

Camera No. 102: This camera is implemented in a hybrid stereoscopic configuration (will be detailed below). The FOV of camera 102 is directed in depth to the farther area with pan and tilt capabilities for scanning. The optical implementation of this camera is designed for long ranges. Camera is in data communication with camera 101 in order to inform camera about potential intrusion detection.

Camera No. 103: This camera is an inquiring Pan-Tilt-Zoom (PTZ) camera (PTZ cameras are built with mechanical parts that allow them to swivel left to right, tilt up and down, and zoom in and out of a scene. They are used to monitor wide open areas requiring a 180 or 360° view, and typically deployed in guard stations where active personnel can operate them through a remote camera controller) with high zoom capability, including visible and Infra-Red (IR) ranges. Camera 103 is activated by camera 101, by transmitting to camera 101, the location where the intrusion detection occurred.

According to an embodiment of the invention, cameras 101 and 102 are continuously activated. At the first step, camera 102 which has long range detection and scanning capabilities performs in-depth detection. Upon such detection, an activation signal is sent from camera 102 to camera 101 for preparedness and raising its sensitivity (via, for example, adaptive thresholds), in order to obtain a higher probability of detection. Generally, a threshold is used to differentiate between objects and the background. When camera 102 detects a suspicious object (according to its parameters, derived from stereoscopic principles) the threshold of camera 102 may be slightly lowered, in order to improve the detection probability, since there is already knowledge about a potential danger.

Upon detecting a relevant intrusion by camera 101, camera 101 transmits the intrusion location to camera 103, for zooming and inquiring purposes. The location may be determined using the Universal Transverse Mercator (UTM—is a map projection system for assigning coordinates to locations on the surface of the Earth) or any other coordinates.

This coordination process between the set of cameras gains target classification capabilities, since this target becomes larger on the camera's sensor, thereby enabling correct classification and identification.

Another advantage of using this integrated system is the target tracking ability, by slaving camera 103 to cameras 101 and 102, without interrupting any running search and scan processes. Upon detecting intrusion and following classification and identification that provide indications regarding a dangerous situation, a suitable alert is issued, for taking further prevention steps.

The slaved camera may be a Pan-Tilt-Zoom (PTZ) camera with high zoom capability, including visible and IR ranges, which is operated by a master camera (101, 102) by transmitting, to the PZT camera, the location where detection occurred, thereby triggering the PZT camera to perform scanning operations in a predetermined area around the location.

FIG. 1 illustrates a hybrid stereoscopic configuration of camera 101, according to an embodiment of the invention.

This configuration comprises two calibrated (but different) cameras 1010 and 1020, one of them (1010) is sensitive to visible light, and the other (1020) is in the IR spectral range, with the stereoscopic properties. This allows accurate estimation of several parameters that characterize every object in the FOV, such as the range, size and movement velocity.

Other configurations, such as full stereoscopy with identical sensors, visible and/or Infrared (IR) sensitive sensors, and even a quadroscopic configuration may also be used. Data fusion between the two stereoscopic channels may also be used to obtain high accuracy. When using visible and IR channels, two disparity maps (sets of detected objects, according to predefined criteria) are obtained by stereoscopy. Data fusion considers the common objects from the two maps, and starts to analyze each of them. Specific algorithms are then used to take decisions concerning the non-matching objects, based on the most relevant channel at that specific time.

Figure 2:
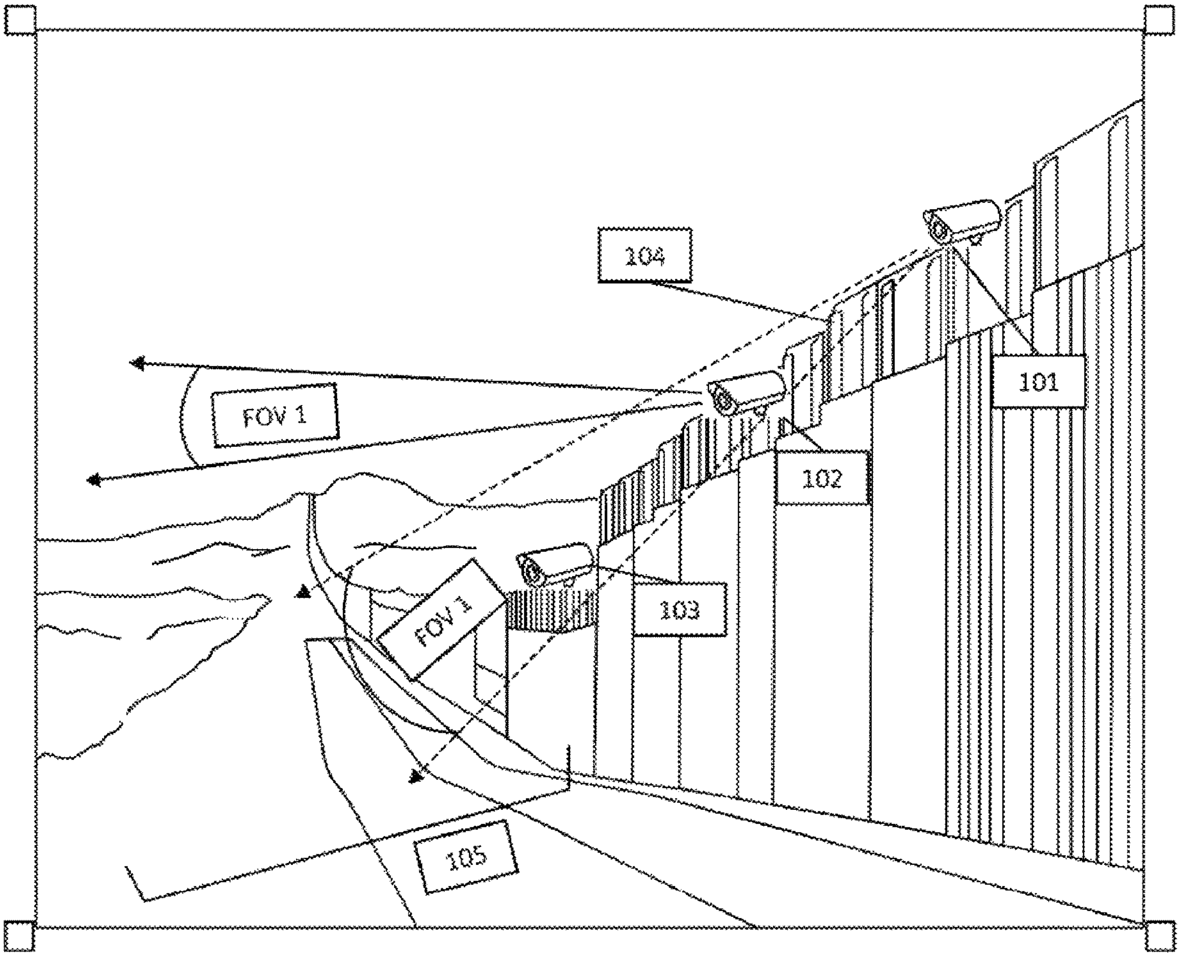
FIG. 2 illustrates the deployment of the set of cameras, according to an embodiment of the invention.

FIG. 2 illustrates the deployment of the set of cameras, according to an embodiment of the invention. It can be seen that a set of the three cameras 101, 102 and 103 is installed in the upper part of the fence 104, in close proximity to each other. Cameras 101 and 102 have FOV1 and FOV2, respectively.

The external side 105 of the fence or separation wall 104 is considered to be a hostile environment with potential intruders, terrorists or even snipers, who have motivation to sabotage and neutralize the deployed cameras. Therefore, the deployed cameras need protection against physical damages and should be bulletproof against potential shooting.

Figure 3:
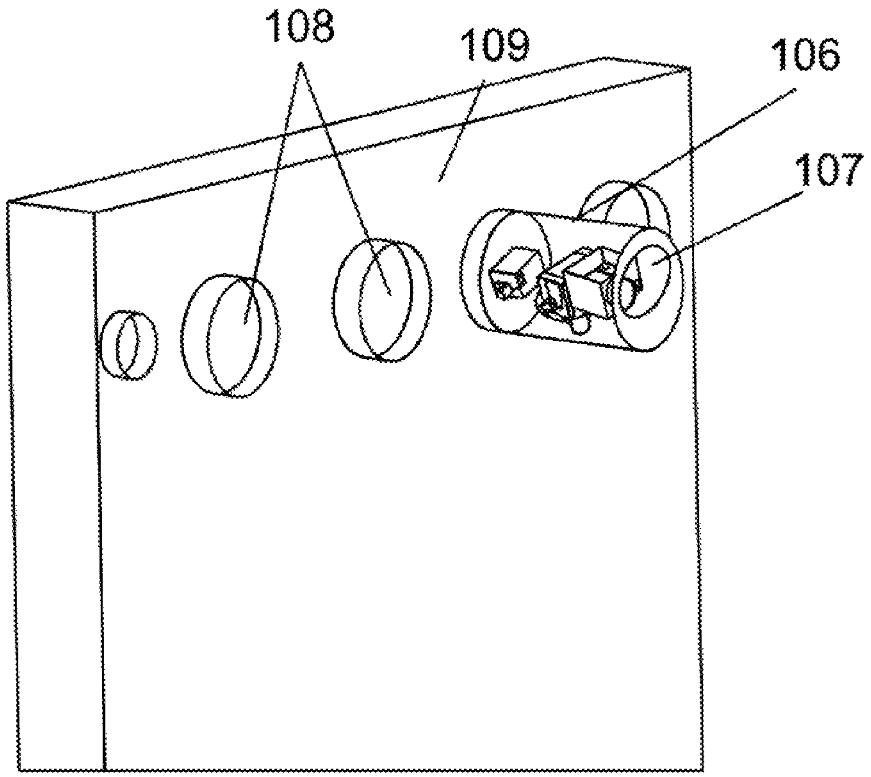
FIG. 3 illustrates adding a protective metallic cylinder to each camera with a corresponding orifice that does not interrupt the FOV.

In order to provide protection to each camera a protective metallic cylinder 106 is added around that camera, with a corresponding orifice 107 that does not interrupt the FOV. The protective metallic cylinders 106 of each camera are installed in specific perforations 108 formed in the wall 109, while allowing rotation of each protective cylinder 106 to cover a wider angle, as illustrated in FIG. 3 (that schematically illustrates the system of three cameras when installed inside a wall or inside a fence). Alternatively, the protective cylinder 106 may be made from a bulletproof transparent material, such as bulletproof glass. This implementation provides maximum coverage to each protected camera.

A similar implementation is used for the inner part of the wall or fence. In case when an intruder succeeded to penetrate the fence, despite the external detection system, the set of cameras can be used to track his movements inside the site, after penetration.

According to another embodiment, the configuration of the set of cameras may be scaled to a real stereoscopic configuration, using a pair of calibrated cameras for cameras 101 and 102 (rather than using a hybrid configuration). This embodiment may be implemented also with cameras that include different sensors formats and resolution. These cameras may even be located at nonaligned positions, and also have different characteristics such as classical and fisheye lens, provided that the FOVs of the cameras will have a specified overlapping area.

Another possible combination includes day cameras (which are sensitive to visible light) and/or IR cameras (which are sensitive to IR radiation in various spectral ranges) and/or any combination of such spectral ranges (e.g., multispectral, which receives data streams from four cameras, consisting of a pair of stereoscopic (thermal) Infra-Red (IR) cameras and a pair of Visible Light (VL) cameras or hyperspectral imaging (HSI) is a technique that analyzes a wide spectrum of light instead of just assigning primary colors (red, green, blue) to each pixel. The light striking each pixel is broken down into many different spectral bands in order to provide more information on what is imaged).

According to another embodiment, the smart wall system is further adapted to detect the intrusion of drones and other UAVs and track them. In this embodiment, camera 102 is a long range in-depth view camera which provides a secondary video stream. The received secondary stream is analyzed for drones and UAVs detection in the far ranges, with suitable software.

Figure 4:
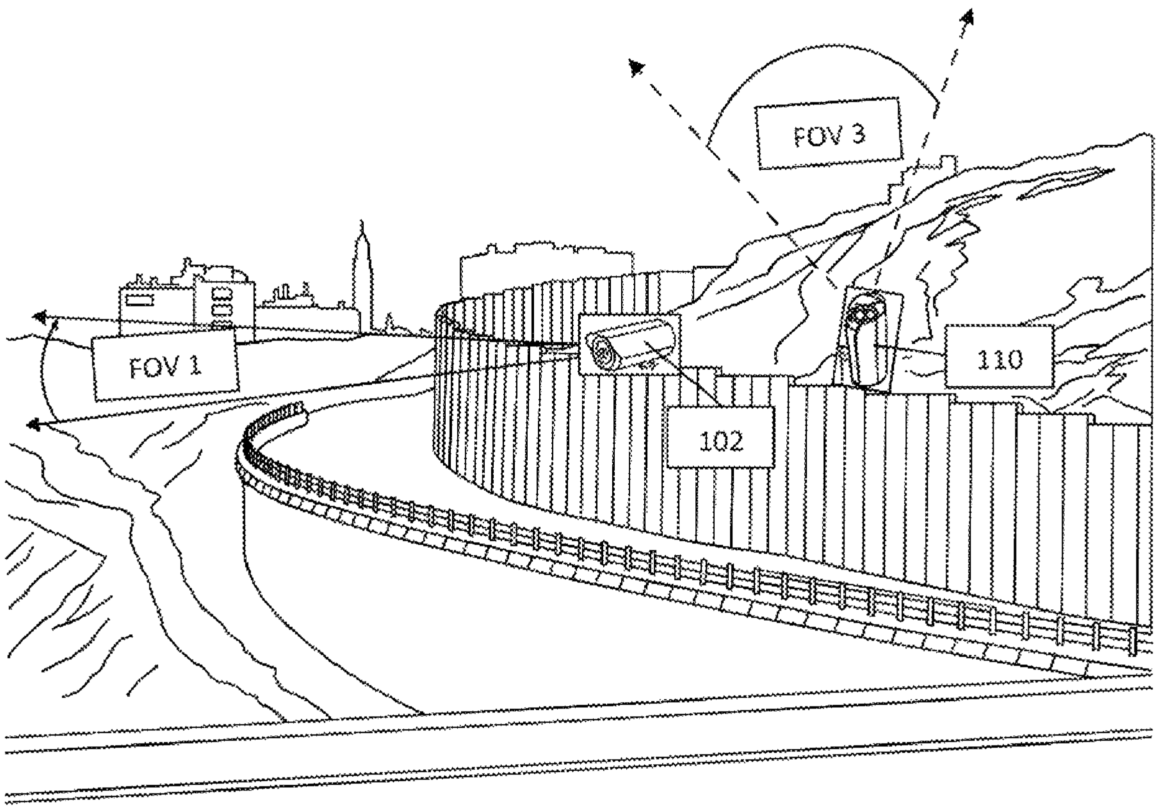
FIG. 4 illustrates the deployment of the set of cameras for UAVs detection, according to an embodiment of the invention.

FIG. 4 illustrates the deployment of the set of cameras for UAVs detection, according to an embodiment of the invention. When a UAV approaches the wall/fence, it will be captured by the added camera 110 which is installed at the higher part of the wall/fence, with a FOV (FOV3) that is directed to the sky. Suitable communication protocols are used to connect between the in-depth cameras 102 (far detection) and the sky looking cameras 110 with a detection range closer to the wall/fence) for thresholds updates, if needed.

A dedicated PTZ camera is activated by the relevant sky looking camera 110, in order to track the penetrating UAV and provide its location at any time, even after crossing the fence/wall boundary. This procedure provides security teams with the necessary information in order to cope with the threat and activate suitable defense means, for removing potential threats imposed by the penetrating UAV.

As various embodiments and examples have been described and illustrated, it should be understood that variations will be apparent to one skilled in the art without departing from the principles herein. Accordingly, the invention is not to be limited to the specific embodiments described and illustrated in the drawings.

The invention claimed is:

1. A system for fence protection, comprising:

a) a first camera in a hybrid stereoscopic configuration, being directed to the area along the lower portion of said fence;

b) a second camera connected to said first camera, for informing said first camera about any potential detection performed by said first camera, said second camera having configuration and optics designed for long ranges, for obtaining in-depth field of view, with pan and tilt capabilities, for allowing scanning and in-depth detection operations;

c) a third inquiring Pan-Tilt-Zoom (PTZ) camera with high zoom capability, including visible and IR ranges, said third PZT camera is operated by said first camera by transmitting, to said third PZT camera, the location where detection occurred, thereby triggering said third PZT camera to perform scanning operations in a predetermined area around said location;

wherein a metallic or a transparent bulletproof glass cylinder is added around each camera for protecting said camera against bullets, to be installed into specific perforations in the wall, for providing rotating capability to said cylinder, in order to cover a wider angle by the protected camera.

2. A system according to claim 1, wherein upon obtaining intrusion detection by the second camera, a signal is sent to the first camera for raising the sensitivity of said first camera, while upon detecting an intrusion by said second camera, transmitting to the third camera the intrusion location for zooming and inquiring purposes.

3. A system according to claim 1, wherein the sensitivity of the first camera is raised by using adaptive thresholds, to obtain a higher detection probability.

4. A system according to claim 1, in which target classification capabilities are obtained by target magnification on the sensor of each camera.

5. A system according to claim 1, in which target tracking capability is obtained by slaving the third camera without interrupting any running search and scan processes.

6. A system according to claim 1, implemented as hybrid stereoscopic configuration, comprising two different calibrated cameras, one camera being sensitive to visible light, and the other camera being in the IR spectral range, with stereoscopic properties.

7. A system according to claim 1, implemented as full stereoscopy with identical sensors, visible and/or IR sensitive, and a quadroscopic configuration, including data fusion between any two stereoscopic channels.

8. A system according to claim 1, comprising day cameras being sensitive to visible light and/or IR cameras being sensitive to IR radiation in various spectral ranges and/or any combination of such spectral ranges.

9. A system according to claim 1, further comprising a) fourth camera with a FOV directed to the sky and having configuration and optics designed for long ranges, for obtaining in-depth field of view, with pan and tilt capabilities, for allowing scanning and in-depth detection operations;

b) a fifth inquiring Pan-Tilt-Zoom (PTZ) camera with high zoom capability, including visible and IR ranges, said fifth PZT camera is operated by said fourth camera by transmitting, to said fifth PZT camera, the location where UAV detection occurred, thereby triggering said fifth PZT camera to perform scanning operations in a predetermined area around said location.

10. A system according to claim 1, in which the fourth camera is installed at the higher part of the wall/fence, with a FOV that is directed to the sky.

* * * * *